(12) United States Patent
Haack et al.

(10) Patent No.: US 6,948,761 B2
(45) Date of Patent: Sep. 27, 2005

(54) TONNEAU COVER APPARATUS

(75) Inventors: Brian Haack, Dimondail, MI (US); Louis Simko, Flushing, MI (US); Gary Mobley, Highland, MI (US)

(73) Assignee: The Colonel's International, Inc., Owosso, MI (US)

( * ) Notice: Subject to any disclaimer, the term of this patent is extended or adjusted under 35 U.S.C. 154(b) by 0 days.

(21) Appl. No.: 10/699,962

(22) Filed: Nov. 3, 2003

(65) Prior Publication Data

US 2004/0119314 A1 Jun. 24, 2004

Related U.S. Application Data

(60) Provisional application No. 60/423,146, filed on Nov. 1, 2002.

(51) Int. Cl.⁷ .................................................. B60P 7/02
(52) U.S. Cl. .......................... 296/100.18; 296/100.16; 296/100.17
(58) Field of Search ................... 296/100.18, 100.02, 296/100.12, 100.17, 37.6, 100.07, 100.16

(56) References Cited

U.S. PATENT DOCUMENTS

| | | | | |
|---|---|---|---|---|
| 4,730,866 A | * | 3/1988 | Nett ....................... | 296/100.18 |
| D333,607 S | * | 3/1993 | Isler ........................... | D8/382 |
| 5,207,262 A | * | 5/1993 | Rushford ................ | 296/100.18 |
| 5,275,458 A | * | 1/1994 | Barben et al. .......... | 296/100.18 |
| 5,322,336 A | * | 6/1994 | Isler ....................... | 296/100.18 |
| 5,511,843 A | * | 4/1996 | Isler et al. ............. | 296/100.17 |
| 5,522,635 A | * | 6/1996 | Downey ................. | 296/100.16 |
| 5,526,866 A | * | 6/1996 | Flentge .................. | 296/100.18 |
| 5,553,652 A | * | 9/1996 | Rushford ............... | 296/100.18 |
| 5,584,521 A | * | 12/1996 | Hathaway et al. ..... | 296/100.18 |
| 5,788,315 A | * | 8/1998 | Tucker ................... | 296/100.16 |
| 5,934,735 A | * | 8/1999 | Wheatley ............... | 296/100.18 |
| 6,024,401 A | * | 2/2000 | Wheatley et al. ...... | 296/100.18 |
| 6,042,173 A | * | 3/2000 | Nett ....................... | 296/100.06 |
| 6,053,558 A | * | 4/2000 | Weldy et al. .......... | 296/100.18 |
| 6,257,306 B1 | * | 7/2001 | Weldy .................... | 296/100.18 |
| 6,257,647 B1 | * | 7/2001 | Ninness et al. ........ | 296/100.18 |
| 6,309,006 B1 | * | 10/2001 | Rippberger ............ | 296/100.18 |
| 6,619,719 B1 | * | 9/2003 | Wheatley ............... | 296/100.18 |
| 6,669,264 B1 | * | 12/2003 | Tucker ................... | 296/100.17 |
| 2002/0109371 A1 | * | 8/2002 | Wheatley ............... | 296/100.18 |
| 2003/0193209 A1 | * | 10/2003 | Melvani ................. | 296/100.02 |

\* cited by examiner

*Primary Examiner*—Kiran B. Patel
(74) *Attorney, Agent, or Firm*—Gifford, Krass, Groh, Sprinkle, Anderson & Citkowski, PC

(57) ABSTRACT

The present invention provides a frame and cover assembly for use with a truck having a truck bed. The frame includes frame bars that are disposable on the top ends of the walls of the truck bed and corner brackets for connecting adjacent bars to form the support frame for the cover material. The cover material attaches to the support frame with fastening means disposed on the perimetric edge of the cover material. The support frame may be used to mount hard, soft or semi-rigid cover materials thereto without any additional components required.

18 Claims, 6 Drawing Sheets

TONNEAU COVER APPARATUS

RELATED APPLICATION

This application claims the benefit of U.S. Provisional Application Ser. No. 60/423,146 filed Nov. 1, 2002.

FIELD OF THE INVENTION

The present invention relates generally to a support frame for truck bed covers and more particularly to a support frame for a bed cover formed of hard, soft or semi-rigid material.

BACKGROUND OF THE INVENTION

Tonneau covers are popular among truck owners not only because of their ability to enhance the appearance of the truck but also to provide a level of protection for items contained in the truck bed that may be noticed by would-be thieves, or simply to provide protection from environmental exposure.

Tonneau covers typically fall into one of two types, hard covers or soft covers. Hard covers are typically formed of a molded synthetic material such as fiberglass or vinyl that are hingedly mounted to the vehicle so as to be lifted up in one or more directions to provide access to the cargo bed. Gas cylinders are attached between a cover support frame and the cover to assist the user in lifting and holding the cover.

Soft tonneau covers are also known which utilize a frame structure for supporting a canvas or soft vinyl material that is disposed over the frame attached to the walls of the truck bed.

In many cases, installation of either of these types of covers becomes tedious and time consuming and in other cases requires that through-holes be made in the truck bed walls in order to facilitate the mounting of the frame structure thereto.

The present invention provides a truck bed cover and frame assembly that enables fast and efficient mounting of hard and soft tonneau covers without the need of having through-holes disposed in the truck bed walls for mounting thereto.

SUMMARY OF THE INVENTION

The present invention provides an inventive support frame for tonneau covers that can be used for covers formed of either hard, soft or semi-rigid materials.

The frame and cover assembly of the present invention has utility for a truck having a truck bed that includes a front wall, left and rear sidewalls and a tailgate such as a pickup truck.

The cover assembly comprises a support frame having left and right frame bars with opposing ends. The left frame bar is adapted to be disposed on a top end of the left wall and the right frame bar is likewise adapted to be disposed on the top end of the right wall.

Front and rear frame bars having opposing ends are also provided wherein the front frame bar is adapted to be disposed on the top end of the front wall while the rear frame bar is likewise adapted to be disposed on the top end of the tailgate.

Four corner brackets are provided and adapted for complementary engagement with the frame bars into channels formed at the ends of adjacent frame bars. The corner brackets permit the frame bars to be connected for forming the support frame for the cover assembly. It is appreciated that the area of the support frame is substantially equivalent to the area defined by the four walls of the truck bed. As such, the size and shape of the support frame imitates the top end of the four walls of the truck bed.

Finally, a cover material is provided that is operative to be selectably attached to the support frame such that the truck bed is completely covered and protected against exposure.

BRIEF DESCRIPTION OF THE DRAWINGS

A better understanding of the present invention will be had upon reference to the following detailed description when read in conjunction with the accompanying drawings in which like parts are given like reference numerals and wherein.

DETAILED DESCRIPTION OF THE INVENTION

Figure 1:
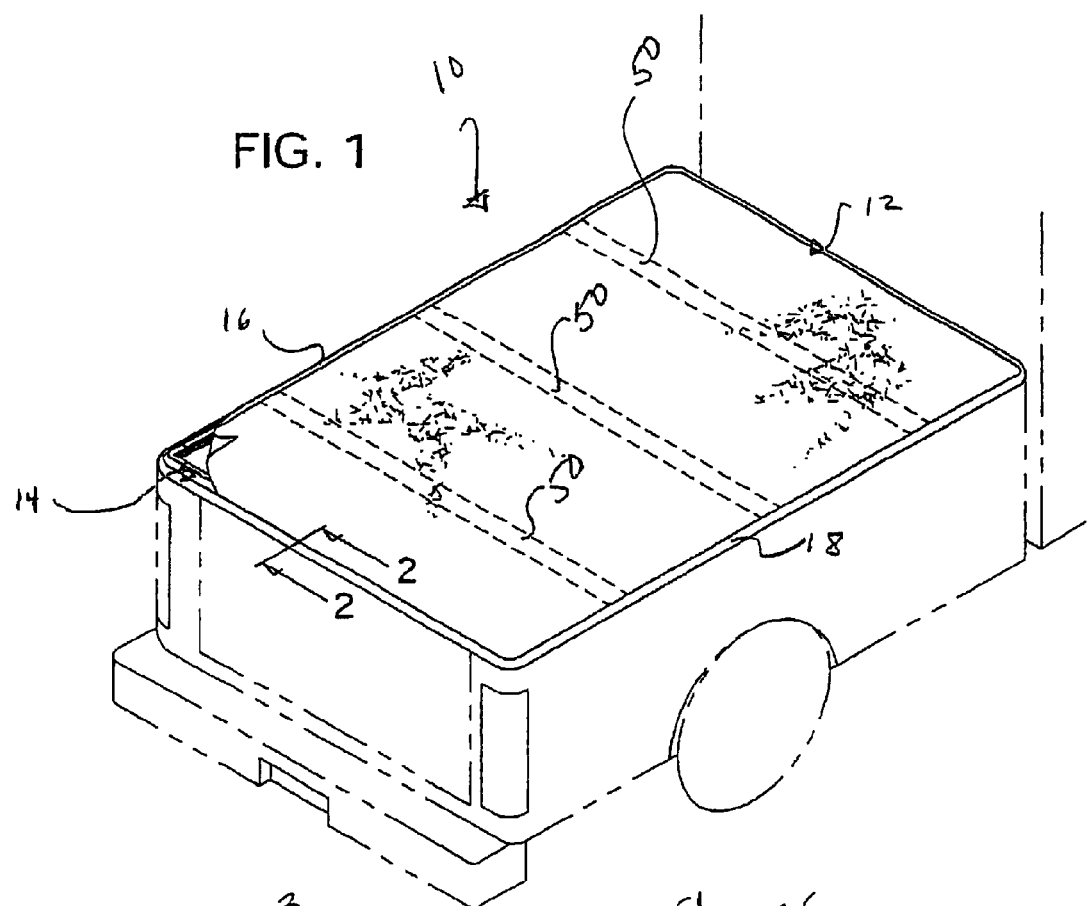
FIG. 1 is a perspective view of the frame and cover assembly disposed on a truck bed as according to the invention.

With reference to FIG. 1, a frame and cover assembly 10 as according to the present invention includes a front frame bar 12 disposed on a top end of the front wall of a truck bed, a rear frame bar 14 disposed on the top end of the tailgate of the truck bed, a left frame bar 16 disposed on the top end of the left sidewall, and a right frame bar 18 disposed on the top end of the right sidewall. Each frame bar is an extrusion of a moldable and durable material illustratively including plastics and metals. It is appreciated that the frame and cover assembly 10 may be adapted for use in other applications illustratively including outdoor canopy and marine applications.

If a soft cover material is used to form the cover for the assembly 10, cover support bars 50 are provided with the frame assembly 10 for supporting the cover material against sagging. Each cover support 50 is preferably formed with spring biased projections extending from its opposing ends wherein the projections are adapted to engage a complementary recess or channel formed in the left and right side bars which will be described in detail hereinafter.

As illustrated, the cover supports 50 extend between the sidewalls of the truck bed and are typically formed such that they are arched upwardly above the plane of the top ends of the truck bed walls whereby the cover material is stretch-fitted over the frame to provide a snug and sleek appearance.

Figure 2:
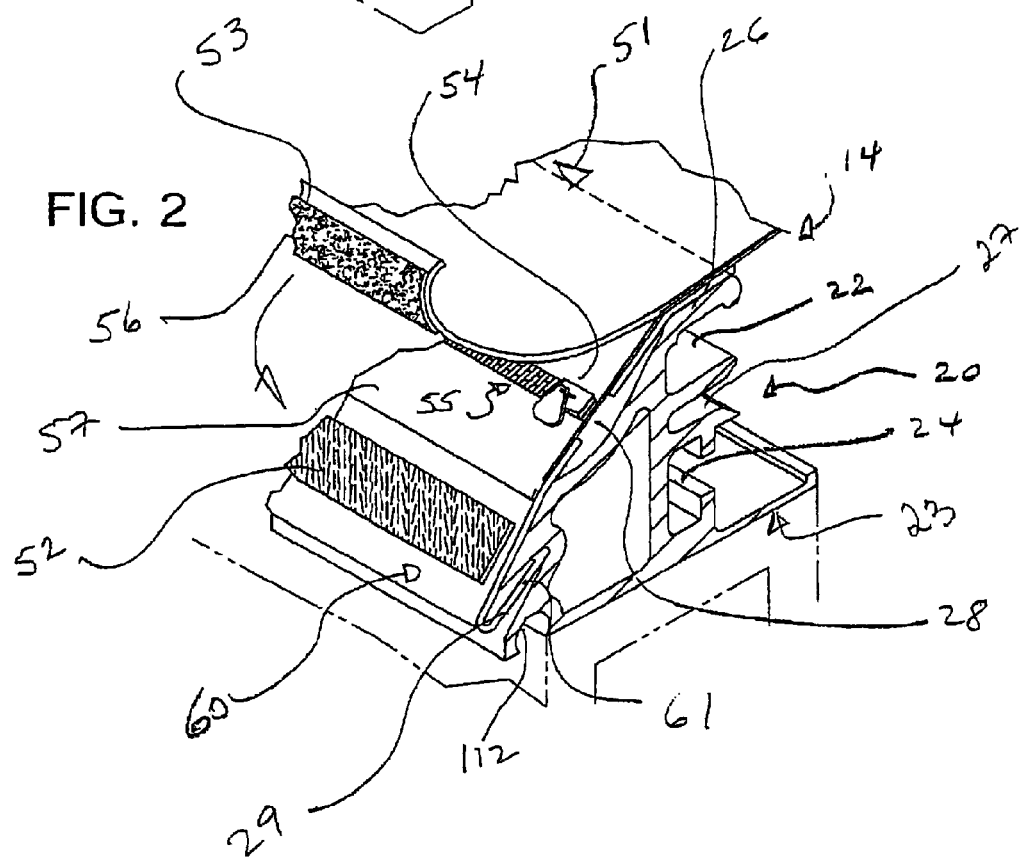
FIG. 2 is a close-up perspective view of the features of a frame bar having a soft cover material attached thereto using a J-clip strip as according to the invention.

Referring now to FIG. 2, a cross-sectional view of the rear frame bar 14 is provided having a soft cover material attached thereto.

The frame bars are preferably extrusions each having a triangular cross section with identical features including a vertical inner side 20, a base 23 and an inclined outer side 25 extending between the base 23 and the inner side 20.

The vertical inner side 20 of the extrusion 14 includes elongated upper 22 and lower 24 channels spaced apart and separated by an elongated middle channel 27 which all extend the length of the bar. A top end 26 of the vertical inner side 20 of the extrusion is substantially flat and is parallel with the base 23.

At the inclined outer side 25, an elongated concave recess 28 is formed and extends along the length of the extrusion. Adjacent the base 23 at the outer side 25 is formed an elongated retaining slot for receiving a fastener attached to the cover material to be described hereinafter.

Figure 8:
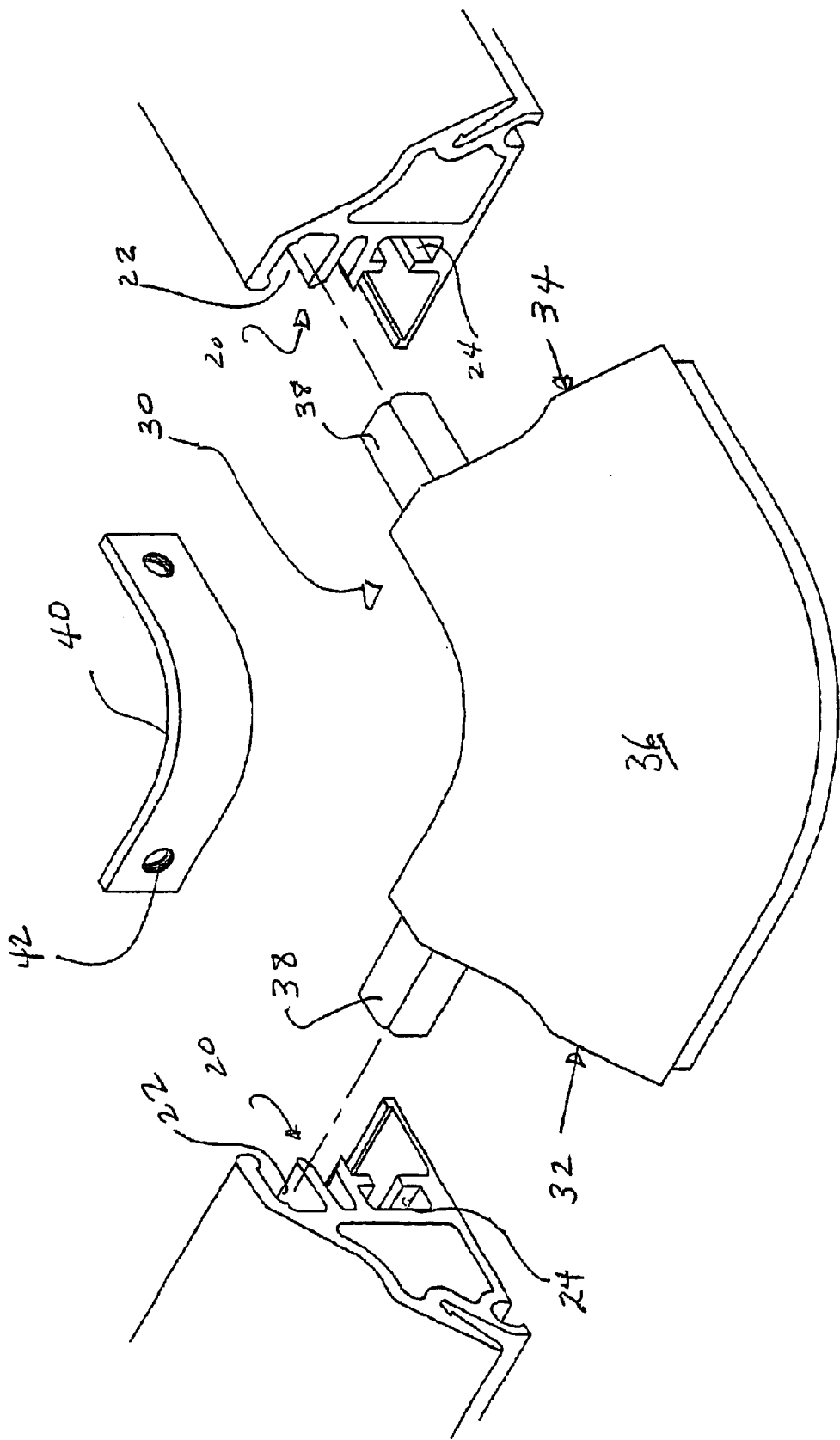
FIG. 8 illustrates an exploded and perspective view of a corner bracket for complementary engagement with the upper and lower channels at the ends of adjacent frame bars.
Figure 9:
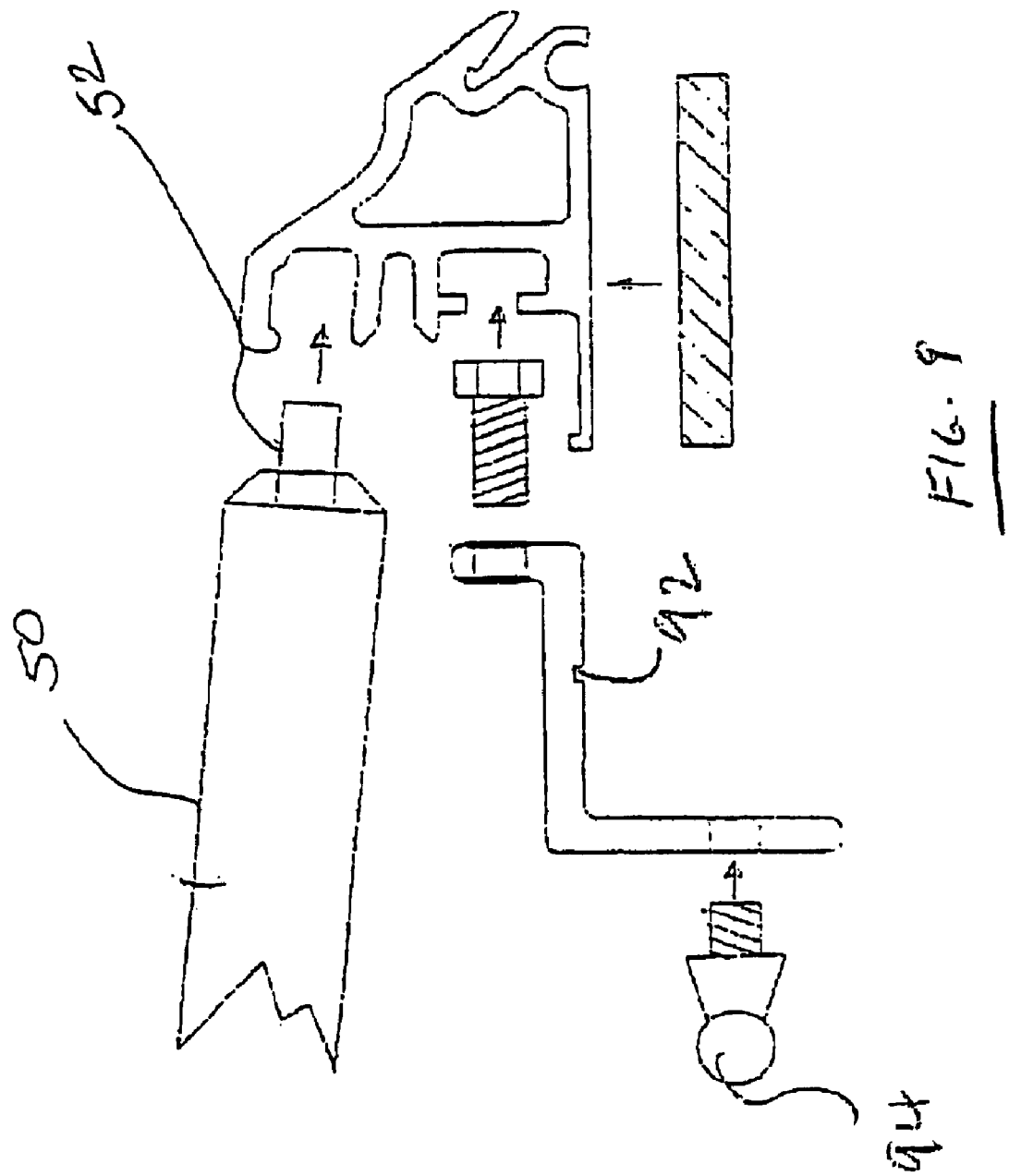
FIG. 9 illustrates a cross-sectional view of a right frame bar adapted to receive a cover support and accessory attachment bracket as according to the invention.

Referring now to FIG. 8, a corner bracket assembly 30 is provided for connecting adjacent ends of frame bars disposed on the top ends of the walls of the truck bed. Each corner bracket 30 has end walls 32 and 34 formed to mirror the triangular shape of the adjacent frame bars to be attached. An outer surface 36 of the corner bracket 30 conforms to the contour of the inclined outer side of the frame bars.

The end walls 32 and 34 of the corner bracket 30 include arms 38 extending therefrom. The arms 38 are adapted to be received in the upper channels 22 of the adjacent frame bars in slip fit engagement such that the frame bars are brought together to form the support frame 11.

Preferably, each corner bracket includes an L-bar 40 that is adapted to be selectably fastened into the lower channels 24 of the adjacent frame bars such that the frame bars are rigidly bound together. The L-bars have fastening apertures 42 formed at opposing ends for receiving a complementary fastener therein. The fasteners and L-bracket cooperate to rigidly bind the corner brackets and frame bars together.

Preferably, each corner bracket 30 cooperates with the adjacent frame bars such that the size of the support frame 11 is adjustable through the adjustment of the arms 38 within the upper channels 22 until the desired size of the frame 11 is obtained. Thereafter, the L-bars are fitted within the lower channels 24 of the adjacent frame bars and fastened thereto to rigidly bind the corner brackets and frame bars at the desired position. This may be particularly advantageous when using a soft cover, since covers have a tendency to stretch. Thus, the frame can be enlarged to take up any slack in the cover.

Referring again to FIG. 2, a soft cover material is illustrated being attached to the frame bar 14. The cover material 51 includes a perimetric edge 53 that is to be attached to the outer side 25 of the frame bar 14. The cover 51 includes a J-clip 60 attached thereto via a zipper 55.

One side 54 of the zipper is stitched to an inner surface of the cover material 51 along three sides of the cover material. The zipper is positioned so that the teeth of the zipper will be centered in the elongated concave recess 28 formed in the outer side 25. The other side 57 of the zipper is attached to the J-clip 60. The J-clip 60 includes a barb portion 61 dimensioned to be snap fitted into the elongated slot 29 formed in the outer side 25 of the frame bar. The other side 57 of the zipper 55 is attached to a portion of the J-clip away from the barb 61. Along the front edge of the cover material 51 a J-clip is sewn directly to the inside surface adjacent the perimetric edge of the cover material 51 such that the cover material may be mounted onto the front frame bar 12 accordingly.

A strip of Velcro 52 is preferably disposed on a portion of the J-clip in a manner that is parallel and adjacent to the other side 57 of the zipper. In such case, the cover material 51 will include a complementary Velcro strip 56 for attaching the perimetric edge 53 to the Velcro strip 52 disposed on the J-clip 60.

Illustratively, a soft cover material is mounted to the support frame 11 by snapping the barb 61 of the J-clips 60 into the elongated slots 29 of the frame bars and zipping the zippers disposed at the three sides of the cover material 51 so that the cover material 51 is pulled tightly over the support frame 11. The outer perimetric edge 53 of the cover material 51 is neatly and securely held in position by the Velcro strips 52 and 56 to provide a smooth and snug fitting appearance over the support frame 11.

When the zipper pullers from different sides of the cover material 51 meet at a corner, a lock can be used to connect the zipper handles together. If two zipper handles do not meet at a corner, fastening loops may be provided on the cover material 51 to enable a lock to be put through the fastening loop and a through hole formed in the zipper handle.

Figure 3:
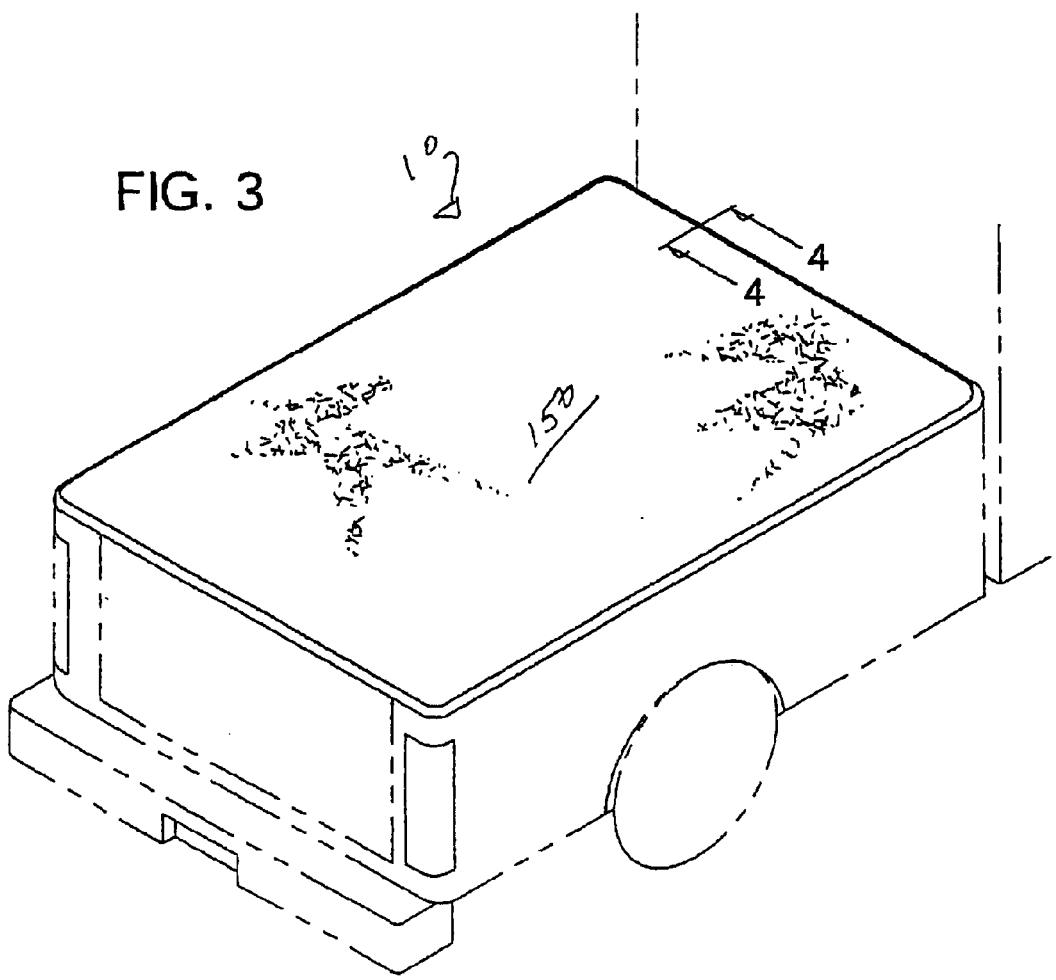
FIG. 3 is a perspective view of the frame and cover assembly disposed on a truck bed wherein the cover material is formed of a hard or semi-rigid material.
Figure 4:
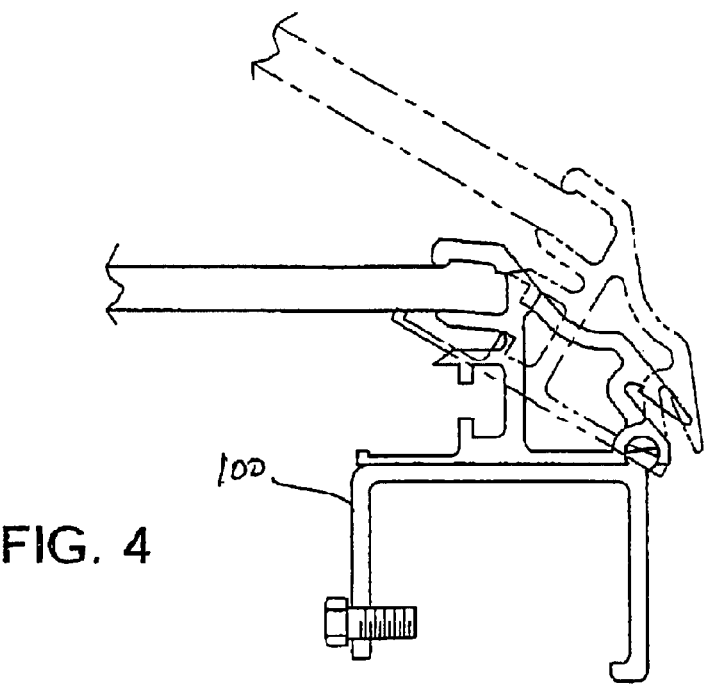
FIG. 4 is a cross-sectional view of the front frame bar of FIG. 3 wherein the cover material is disposed in an upper channel of the front frame bar.

FIGS. 3 and 4 illustrate how the support frame 11 may be used to support a semi-rigid or hard cover material in the upper channel 22 of the frame bars. As shown in FIG. 3, a semi-rigid cover 150 material is provided wherein an upper portion of the cover is formed by laying a piece of canvas over a mold having a shape corresponding to the desired shape of the cover. The canvas is then sprayed with a reinforcing hydrophobic polymer illustratively comprised of polyurea, elastomers, and polyacrylates which facilitate the formation of a semi-rigid surface. The surface may be texturized to have the feel and appearance of Naugahyde, however, the coating provides a semi-rigid cover more rigid than typical Naugahyde. The semi-rigid cover is formed is adapted to be attachable to the frame bars in a manner similar to the soft cover as described above.

Figure 10:
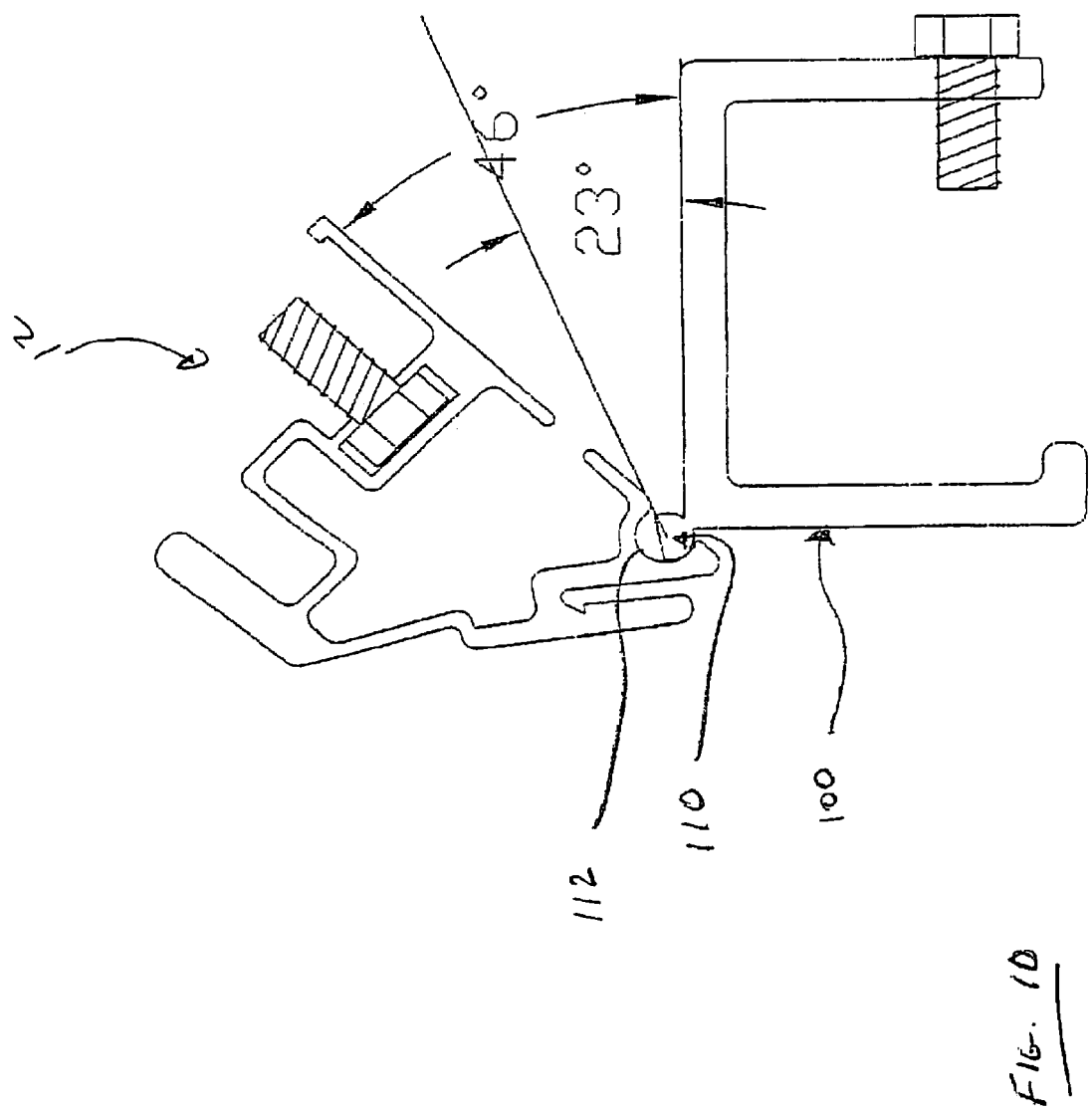
FIG. 10 illustrates a cross-sectional view of a front frame bar pivotally attached to a hinge clamp that mounts to the top end of the front wall as according to the invention.

As shown in FIG. 4, a hinged clamp 100 is provided for attaching the front frame bar to the front wall of the truck bed. Referring to FIG. 10, the hinged clamp 100 includes a hinge strip 110 to be received in a hinge slot 112 formed along an edge of the base 23 of the front frame bar 12.

As shown, the front frame bar 12 of the support frame 11 may be positioned on the front wall by bolting the hinge clamp 100 to the top end of the front wall and permitting the outer edge of the hinge strip 110 to slide into the hinge slot 112 of the frame bar 12. Once seated, the support frame 11 may be pivoted outwardly from a 46° angle to lock the hinge strip 110 within the hinge slot 112 of the frame bar 14. In this manner, as long as the support frame 11 does not pivot above 23°, it remains fully engaged to the front wall of the truck bed.

Figure 5:
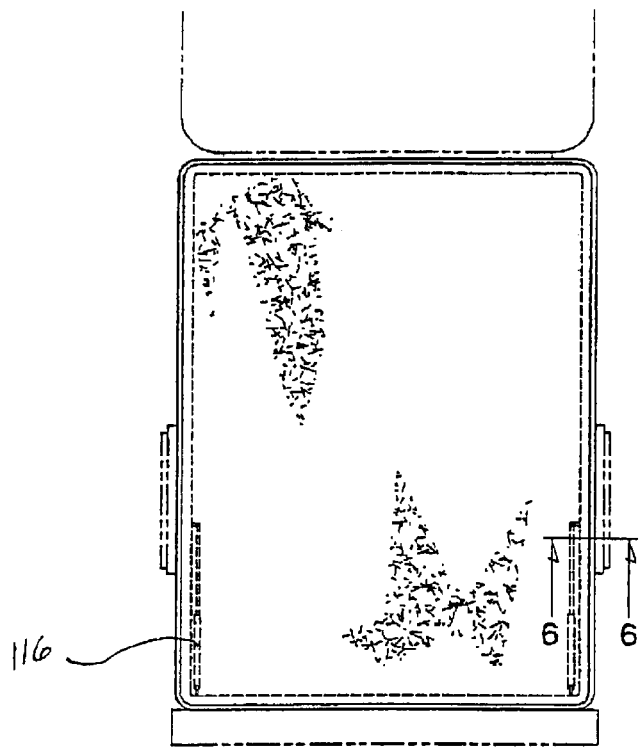
FIG. 5 is an overhead view of the frame and cover assembly including an optional lift piston for supporting the cover material in a raised position.

FIG. 5 illustrates an optional lift piston 116 which may be provided to facilitate lifting and holding the support frame 11 in a raised position when pivoted about the front wall of the truck bed.

Figure 6:
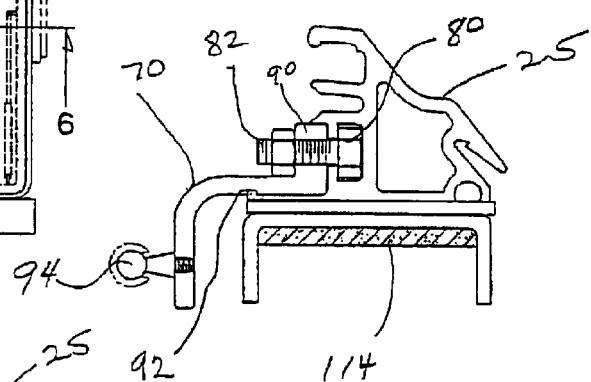
FIG. 6 illustrates a cross-sectional view of the right frame bar having an accessory attachment bracket disposed in a lower channel thereof.
Figure 7:
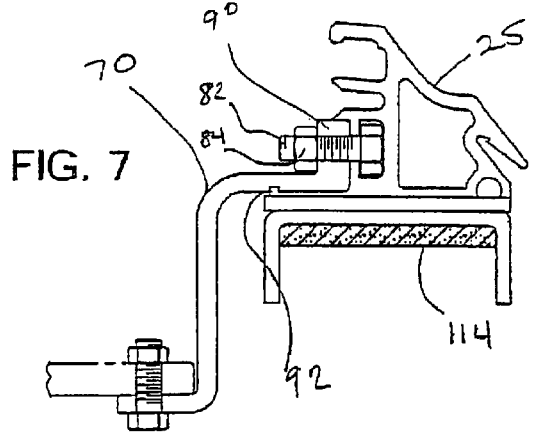
FIG. 7 illustrates a cross-sectional view of a right frame bar having a second accessory attachment bracket disposed in the lower channel thereof.

FIGS. 6 and 7 illustrate accessory attachment brackets 70 that may be mounted to bolts mounted to the lower channels 24 of the left and right frame bars. The heads of the bolts are held by flanges so that the threaded shaft of the bolt extends from the channels 24. The accessory attachment brackets 70 have a vertical portion 90 with a hole for mounting on the shaft 82 of the bolt and a horizontal portion having a slot 92 to receive a flange extending from the frame bar. Alternatively, a nut 84 can be inserted in the channel 24 and a threaded fastener may be inserted into the nut 82 for securing the attachment bracket.

As further illustrated in FIGS. 6 and 7, hinged clamps 100 may be mounted to the walls of the truck bed on foam strips for providing a more stable attachment and prevent marring of the bed finish.

As mentioned above, the extrusions of the support frame 11 may be formed of any extrudable material of sufficient strength and durability suitable for such purpose. If the cover material provided is soft, the cover material may be selected from the group consisting of vinyl, canvas, plastic and/or synthetic manmade materials. If the cover material is desired to be hard, the cover material is preferably selected from the group consisting of fiberglass, metal, wood, vinyl and hard plastics.

From the foregoing, an inventive frame and cover assembly is provided for attaching to and protecting a truck bed without the need for making through holes in the truck bed for mounting the assembly thereto. Having described the invention in detail, it is appreciated that it may become apparent to one skilled in the art that other embodiments of the present invention may be resorted to, however, without exceeding the scope of the present invention.

We claim:

1. A tonneau cover assembly for a truck bed having a front wall, left and right sidewalls, and a rear tailgate, said cover assembly comprising:

a frame including a front frame bar, an opposed rear frame bar, a left side frame bar and an opposed right side frame bar, wherein each of said frame bars includes a base, a vertically oriented inner side extending from said base and an inclined outer side extending between said base and said inner side and said vertical inner side forms an elongated upper channel, an elongated middle channel, and an elongated lower channel;

a corner bracket for interconnecting adjacent frame bars, wherein said corner bracket includes an arm adapted to be received in said upper channel of said adjacent frame bars; and a cover secured to said frame, wherein said cover includes a J-clip extending longitudinally along an outer edge of said cover, and said J-clip is fittingly engaged in a longitudinally extending slot formed in an outer side of said frame bar, to secure said cover to said frame.

2. The cover assembly of claim 1 further comprising an L-bar, selectably fastened into the lower channel of said adjacent frame bar, such that the support frame is rigidly bound to said corner bracket.

3. The cover assembly of claim 1 wherein a size of said support frame is adjustable by positioning of the corner brackets and L-bars relative to said frame bars.

4. The cover assembly of claim 1 wherein the cover material is formed of a non-rigid material having a perimetric edge selected from a group consisting of vinyl, canvas, plastic or a synthetic material.

5. The cover assembly of claim 1 further comprising at least one cover support, said cover support having opposing ends operative to be received into a portion of said elongated upper channel formed in said vertical inner side of said left frame bar and said vertical inner side of said right frame bar.

6. The cover assembly of claim 1 wherein said J-clip includes a barb portion operative to be received into the elongated slot formed in said outer side of said frame bar.

7. The cover assembly of claim 1 wherein said cover includes a zipper extending along at least one side edge of said cover material, wherein said zipper is centered in an elongated concave recess formed in said outer side of said frame bar.

8. The cover assembly of claim 7 wherein the cover includes a perimetric edge that includes a longitudinally extending reclosable fastener operative to engage a complementary fastener disposed on the J-clip.

9. A tonneau cover assembly for a truck bed having a front wall, left and right sidewalls, and a rear tailgate, said cover assembly comprising:

a frame including a front frame bar, an opposed rear frame bar, a left side frame bar and an opposed right side frame bar, wherein each of said frame bars includes a base, a vertically oriented inner side extending from said base and an inclined outer side extending between said base and said inner side and said vertical inner side forms an elongated upper channel, an elongated middle channel, and an elongated lower channel;

a corner bracket for interconnecting adjacent frame bars, wherein said corner bracket includes an arm adapted to be received in said upper channel of said adjacent frame bars;

an L-bar selectably fastened into the lower channel of said adjacent frame bars, such that the support frame is rigidly bound to said corner bracket, and a size of said support frame is adjustable by positioning of the corner brackets and L-bars relative to said frame bars; and a cover secured to said frame, wherein said cover includes a J-clip extending along an outer edge of said cover, and said J-clip is fittingly engaged in an elongated slot formed in an outer side of said frame bar, to secure said cover to said frame.

10. The cover assembly of claim 9 wherein the cover material is formed of a non-rigid material having a perimetric edge selected from a group consisting of vinyl, canvas, plastic or a synthetic material.

11. The cover assembly of claim 9 further comprising at least one cover support, said cover support having opposing ends operative to be received into a portion of said elongated upper channel formed in said vertical inner side of said left frame bar and said vertical inner side of said right frame bar.

12. The cover assembly of claim 9 wherein said J-clip includes a barb portion operative to be received into the elongated slot formed in said outer side of said frame bar.

13. The cover assembly of claim 9 wherein said cover includes a zipper extending longitudinally along at least one side edge of said cover material, wherein said zipper is centered in a longitudinally extending concave recess formed in said outer side of said bar.

14. The cover assembly of claim 9 wherein the cover includes a perimetric edge that includes a longitudinally extending reclosable fastener operative to engage a complementary longitudinally extending reclosable fastener disposed on the J-clip.

15. A tonneau cover assembly for a truck bed having a front wall, left and right sidewalls, and a rear tailgate, said cover assembly comprising:

a frame including a front frame bar, an opposed rear frame bar, a left side frame bar and an opposed right side frame bar, wherein each of said frame bars includes a base, a vertically oriented inner side extending from said base and an inclined outer side extending between said base and said inner side and said vertical inner side forms an elongated upper channel, an elongated middle channel, and an elongated lower channel;

a corner bracket for interconnecting adjacent frame bars, wherein said corner bracket includes an arm adapted to be received in said upper channel of said adjacent frame bars;

an L-bar selectably fastened into the lower channel of said adjacent frame bars, such that the support frame is rigidly bound to said corner bracket, and a size of said support frame is adjustable by positioning of the corner brackets and L-bars relative to said frame bars;

a cover secured to said frame, wherein said cover includes a J-clip extending longitudinally along an outer edge of said cover, and said J-clip is fittingly engaged in a longitudinally extending elongated slot formed in an outer side of said frame bar, to secure said cover to said frame, said cover includes a zipper extending longitudinally along at least one side edge of said cover material and said zipper is centered in a longitudinally extending concave recess formed in said outer side of said frame; and a perimetric flap extending longitudinally along an edge of said cover and having a longitudinally extending reclosable fastener that is operative to engage a complementary longitudinally extending reclosable fastener disposed on the J-clip.

16. The cover assembly of claim 15 wherein the cover material is formed of a non-rigid material having a perimetric edge selected from a group consisting of vinyl, canvas, plastic or a synthetic material.

17. The cover assembly of claim 9 further comprising at least one cover support, said cover support having opposing ends operative to be received into a portion of said elongated upper channel formed in said vertical inner side of said left frame bar and said vertical inner side of said right frame bar.

18. The cover assembly of claim 15 wherein said J-clip strip includes a barb portion operative to be received into the elongated slot formed in said outer side of said frame bar.

* * * * *

UNITED STATES PATENT AND TRADEMARK OFFICE
CERTIFICATE OF CORRECTION

PATENT NO. : 6,948,761 B2
DATED : September 17, 2005
INVENTOR(S) : Brian Haack et al.

It is certified that error appears in the above-identified patent and that said Letters Patent is hereby corrected as shown below:

<u>Title page,</u>
Item [75], Inventors, replace "Gary Mobley" with -- Gary M. Bley --, Signed and Sealed this Sixth Day of June, 2006

JON W. DUDAS
*Director of the United States Patent and Trademark Office*

UNITED STATES PATENT AND TRADEMARK OFFICE
CERTIFICATE OF CORRECTION

PATENT NO. : 6,948,761 B2  Page 1 of 1
APPLICATION NO. : 10/699962
DATED : September 27, 2005
INVENTOR(S) : Brian Haack et al.

It is certified that error appears in the above-identified patent and that said Letters Patent is hereby corrected as shown below:

<u>Title page</u>,
Item [75], Inventors, replace "Gary Mobley" with -- Gary M. Bley --, This certificate supersedes Certificate of Correction issued June 6, 2006.

Signed and Sealed this

Fourth Day of July, 2006

JON W. DUDAS
*Director of the United States Patent and Trademark Office*